2,960,548
EXTRACTION OF AROMATICS FROM HYDROCARBON FRACTIONS

George W. Ayers, Chicago, and William A. Krewer, Arlington Heights, Ill., assignors to The Pure Oil Company, Chicago, Ill., a corporation of Ohio
No Drawing. Filed Sept. 19, 1958, Ser. No. 761,943
18 Claims. (Cl. 260—674)

This invention relates to the art of separating predominantly aromatic hydrocarbons from hydrocarbon fractions containing same by solvent extraction with a particular class of organic ester solvents. More particularly, this invention relates to a process for extracting aromatics and homologues thereof from naphtha hydrocarbon mixtures by solvent extraction with glycol esters of keto-acids, or di- or polyglycol ether esters of keto-acids.

It has been found that glycol or di- or polyglycol ether esters of keto-acids, which esters have the general formula,

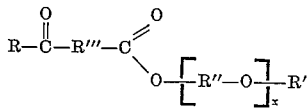

are good selective solvents for aromatic-type hydrocarbons. The formula represents both the mono- and di-esters of glycols, or di- or polyglycol ethers, and keto-acids, and their mixtures. In the formula, $x$ may be any number from 1 to 6, preferably 1 or 2. When $x$ is 2, an ester of diethylene glycol is represented. R in the above formula may be an alkyl group of 1 to 8 carbon atoms or a cycloalkyl group of 3 to 8 atoms while R'' and R''' are alkylene groups or substituted alkylene groups such as —CH$_2$—, —CH$_2$CH$_2$—, —C(CH$_3$)$_2$CH$_2$—, —CH(CH$_3$)CH(CH$_3$)—, —C(CH$_3$)$_2$C(CH$_3$)$_2$—
—CH$_2$C(CH$_3$)$_2$—
—CH$_2$CH$_2$CH$_2$—
CH$_2$CH$_2$CH$_2$CH$_2$—
—CH$_2$CH$_2$CH$_2$C(CH$_3$)$_2$—
—CH$_2$C(CH$_3$)$_2$CH$_2$CH$_2$—
CH$_2$—
—CH$_2$CH(CH$_3$)CH$_2$CH$_2$CH$_2$CH$_2$— and

—CH$_2$(CH$_2$)$_7$CH$_2$—

Examples of R groups include methyl, ethyl, propyl, isopropyl, butyl, sec-butyl, tert-butyl, amyl, isoamyl, tert-amyl, hexyl, isohexyl, 2-ethylbutyl, 2,3-dimethylbutyl, methylisobutyl, 2-ethylpentyl, 3-ethylpentyl, octyl and neopentyl groups. R' may be hydrogen or the radical

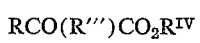

which occurs in the first portion of the molecule as just defined. R''' will be absent and the carbonyl carbons directly joined in the case of pyruvic acid esters.

Esters of this type are prepared by the reaction of the corresponding keto-acid, selected from the group consisting of pyruvic acid, acetoacetic acid, levulinic acid, mesitonic acid, γ-acetobutyric acid, lactarinic acid, geronic acid, isogeronic acid, keto-stearic acids and keto-heptoic acids, with a glycol or di- or polyglycol ether to form the mono- or di-ester thereof. The glycol or di- or polyglycol ethers may be selected from among a group such as ethylene glycol (glycol), diethylene glycol, triethylene glycol, pentamethylene glycol, propylene glycol, trimethylene glycol, alpha-butylene glycol, beta-butylene glycol, 1,4-butanediol, isobutylene glycol and pinacol.

All of the glycols and polyglycols used herein are known or commercially available and their preparation need not be described. The higher molecular weight keto-acids are obtained by a variety of reactions. In one method alkyl zinc halides are reacted with acid chlorides of ester acids to give compounds of the formula, $$RCO(R''')CO_2R^{IV}$$

The alkyl zinc compounds, unlike the Grignard reagent, do not react readily with ester or ketone groups, thus making this reaction possible. The $R^{IV}$ group is replaced through hydrolysis to form the acid prior to esterification with the glycol or polyglycol. Sodiomalonic ester and sodioalkylmalonic esters, when so reacted and followed by hydrolysis and decarbonization, give $$CH_3CO(CH_2)_nCOOR'$$

and $RCH_2CO(CH_2)_n$—COOR'. Thus, the ester chloride of adipic acid and malonic ester give a 48% yield of ε-ketoheptoic acid. Another method is the action of mercuric salts or of sulfuric acid with acetylenic acids. This reaction is illustrated by the transformation of oleic acid to the brominated form, removal of HBr to form the acetylenic acid, and oxidation to 10-ketostearic acid. Since these methods of preparation are known, no further explanation as to how to prepare the keto-acids is necessary.

Since the reaction between acids and alcohols to form esters is well known, there is no necessity to describe in detail the procedure that would be used to obtain all of the esters of keto-acids coming within the scope of this invention. Most of the esters can be obtained by bringing together 1:1 or 2:1 mol ratios of the acid and glycol and applying heat to complete the reaction. Di-esters are formed generally by using a 2:1 mol ratio of acid to glycol. Various catalysts may be used to promote the reaction. The reaction product may be separated and purified by distillation.

One means of preparing the glycol or di- or polyglycol ether keto-acid esters of this invention is to heat together under reflux for several hours a mixture of a glycol (or di- or polyglycol ether) such as ethylene glycol or diethylene glycol, and a keto-acid, such as pyruvic or levulinic acid, with a small amount of an esterification catalyst such as p-toluene sulfonic acid. The ester may be isolated by fractional distillation of the crude product under vacuum. Diethylene glycol dilevulinate boils at approximately 179° C. under 0.1 pressure and was prepared by this method in good yields. Similarly, ethylene glycol mono-pyruvate, boiling at approximately 110–118° C. under 0.5 mm. pressure, was prepared. They glycol esters of acetoacetic acid must be prepared by methods other than refluxing, since free acetoacetic acid is unstable.

Accordingly, the esters used may be selected from any combination of keto-acid and glycol, or di- or polyglycol ether, such as those in the following table:

TABLE I

| Keto Acid | Glycol |
| --- | --- |
| pyruvic acid. | ethylene glycol. |
| acetoacetic acid. | propylene glycol. |
| levulinic acid. | isobutylene glycol. |
| mesitonic acid. | trimethylene glycol. |
| γ-acetobutyric acid. | beta butylene glycol. |
| lactarinic acid. | 1,4-butanediol. |
| geronic acid. | pinacol. |
| isogeronic acid. | diethylene glycol. |
| ε-ketoheptoic acid. | triethylene glycol. |
| 10-ketostearic acid. | tetraethylene glycol. |
| | pentaethylene glycol. |

Accordingly, it becomes a primary object of this invention to provide a process for extracting aromatic-type hydrocarbons from mixtures containing same by treatment with a solvent comprising a mono- or di-ester of a keto-acid and a glycol or di- or polyglycol ether.

Another object of this invention is to provide a process for the selective separation of aromatic-type hydrocarbons from mixtures containing same by extraction with certain glycol or di- or polyglycol ether esters of keto-acids.

A further object of the invention is to provide a process for separating substantially pure benzene from hydrocarbon fractions containing same.

Another object of the invention is to provide a new class of selective solvents which are glycol or di- or polyglycol ether esters of keto-acids.

These and further objects of the invention will become apparent as the description of the invention proceeds.

It is recognized in the prior art that aliphatic ketoesters of the general formula,

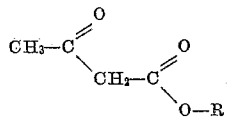

where R is an alkyl group such as ethyl, are useful in separating an oil containing aromatic, paraffinic and naphthenic hydrocarbons into fractions richer in paraffinic and naphthenic compounds by selective extraction methods. However, it has been found that this class of compounds is not suitable for treating gasolines and naphthas for the purpose of extracting aromatics therefrom. This is demonstrated by the following examples:

EXAMPLE I

An attempt was made to extract a fluid-catalytic-cracked gasoline containing about 30% of benzene using known methods of extraction with ethyl acetoacetate as the selective solvent. This ester proved to be miscible with the gasoline at ambient temperatures and phase separation could not be induced.

EXAMPLE II

A mixture of 26.7 volume percent of toluene, and 73.3 volume percent of n-heptane was treated with various volume ratios of ethyl acetoacetate. It was found that ethyl acetoacetate was miscible in all proportions with the mixture at room temperature.

EXAMPLE III

A mixture of toluene and n-heptane as used in Example II was mixed with half its volume of ethyl acetoacetate and cooled to 0° C. Separation into two phases resulted. The upper (raffinate) phase, amounting to 29 cc., by analysis showed 23.3 cc. of toluene-n-heptane mixture containing 23.0% of toluene. The lower (extract) layer, amounting to 21 cc., yielded 10 cc. of a toluene-n-heptane mixture containing 35.3% of toluene.

These results show that this type of ester is not satisfactory for the extraction of aromatics from hydrocarbon mixtures containing same even under optimum conditions of extraction. From the standpoint of both poor selectivity and lack of compatibility with water used to improve selectivity, the type of ester exemplified by ethyl acetoacetate cannot be efficiently used as a selective solvent.

In general, this invention contemplates the extraction of aromatic-type hydrocarbons, particularly benzene and its alkyl derivatives, including toluene and xylene, from hydrocarbon mixtures which boil in the gasoline and naphtha range. The hydrocarbon mixtures which may be subjected to extraction by the solvents of this invention include various petroleum fractions, hydroformate fractions, thermally-cracked petroleum fractions, catalytically-cracked petroleum oils, and other hydrocarbon mixtures containing aromatic hydrocarbons, particularly benzene, toluene and xylene.

In order to further demonstrate the invention, the following examples are given:

EXAMPLE IV

A mixture composed of 25.4% toluene and 74.6% n-heptane was agitated for two minutes with half its volume of diethylene glycol dilevulinate. The two liquid layers were separated and the extracted hydrocarbons were distilled from the solvent layer, using vacuum. The yield of hydrocarbon extract was 8% of the hydrocarbon charge, and the extract contained 91% toluene.

EXAMPLE V

A mixture composed of 27.1% toluene and 72.9% n-heptane was agitated for two minutes with half its volume of ethylene glycol mono-pyruvate. The extract layer was removed and the extracted hydrocarbons were distilled therefrom using vacuum. The yield of hydrocarbon extract was 7% of the hydrocarbon charge, and the extract contained 86.0% toluene.

EXAMPLE VI

A mixture composed of 26.9% toluene and 73.1% n-heptane was agitated for two minutes with twice its volume of diethylene glycol dilevulinate. The extract layer was removed and the extracted hydrocarbons were removed by vacuum distillation. The yield of hydrocarbon extract was 26% of the hydrocarbon charge, and the extract contained 64.7% toluene.

EXAMPLE VII

A mixture containing about 33 vol. percent of aromatics, viz., benzene, toluene and xylenes, is treated with half its volume of ethylene glycol mono-acetoacetate to form an upper raffinate phase and a lower extract phase at ambient conditions. The extract phase is separated by decantation and a benzene, toluene, xylene mixture is recovered in good yield and high purity.

EXAMPLE VIII

The mixture of Example VII is treated with butanediol dimesitonate in volume ratios of 3/1, respectively, to recover from the extract phase a fraction consisting almost entirely of benzene, toluene and xylene.

EXAMPLE IX

A mixture of toluene and n-heptane as used in Example II is mixed with half its volume of tetramethylene glycol monoacetobutyrate and cooled to about 10° C. Separation into two phases results and the lower extract layer after removal of the solvent comprises substantially pure toluene.

EXAMPLE X

A mixture comprising about 25% benzene and 75% n-hexane is agitated with half its volume of isobutylene glycol monolactarinate for about 5 minutes. The two liquid layers are separated and the extracted hydrocarbons are distilled from the solvent layer, using vacuum. The yield of hydrocarbon extract is good, and the extract contains as much as 90% of benzene.

Other specific examples of keto-acid esters of glycols that may be used are propylene glycol monopyruvate, propylene glycol dipyruvate, trimethylene glycol monopyruvate, trimethylene glycol dipyruvate, butylene glycol monopyruvate, butylene glycol dipyruvate, tetramethylene glycol monopyruvate, tetramethylene glycol dipyruvate, pinacol monomesitonate, pinacol dimesitonate, isobutylene glycol monolactarinate, isobutylene glycol dilactarinate, ethylene glycol monoisogeronate, diethylene glycol diisogeronate, butylene glycol monogeronate, butylene glycol digeronate, dimethylene glycol monomesitonate, triethylene glycol monopyruvate, triethylene glycol dipyruvate, tetraethylene glycol monolevulinate, tetraethylene glycol dilevulinate, pentaethylene glycol dipyruvate, pentaethylene glycol monolevulinate and pentaethylene glycol dilevulinate.

From the foregoing experiments it is seen that the yield and selectivity of these extractions is high and that by the method of this invention good separation of aromatics can be obtained.

The process of this invention is carried out using conventional extraction procedures wherein the aromatic hydrocarbon mixture is contacted with the keto-glycol or di- or polyglycol ether ester in either batchwise or countercurrent treatment. Successive batchwise extractions may be used. In the preferred method of practicing the invention, the hydrocarbon mixture to be treated is contacted in a countercurrent tower with the ester in a continuous flow method and the unextracted hydrocarbons and the solvent containing the extracted aromatic hydrocarbons are cooled separately and allowed to settle. The mixture of unextracted hydrocarbons, called the raffinate, is washed with a small quantity of water and is utilized in a usual manner, as for example, a component of a gasoline blend. The aromatic hydrocarbons may be recovered from the solvent extract layer by various means. In one method water may be added, whereupon the aromatic desired is caused to separate from the diluted solvent, and may be withdrawn, washed with a small quantity of water and, if desired, fractionally distilled. Such distillation accomplishes essentially the separation of the individual aromatic hydrocarbons that were present in the original mixture.

The solvent, after removal of water by fractional distillation, may be used again per se as fresh extraction solvent, or ti may be augmented with fresh solvent for recycle to the extraction tower. Another method of separation comprises vacuum distillation of the separated extract. The aromatic components recovered by vacuum distillation may be further fractionally distilled in order to separate the individual components. The solvent after the removal of the aromatics from the extract phase is used again as fresh extraction solvent, since it is practically pure glycol or di- or polyglycol ether ester of a keto-acid.

The extraction procedure may be varied by adding a small quantity of water to the extraction solvent to get maximum selectivity towards aromatic hydrocarbons. The amount of hydrocarbon removed, as well as the concentration of aromatics in the hydrocarbon removed, is very sensitive to the water content of the solvent during extraction. In general, between about 2.0 and 30.0 volume percent of water may be used with the solvents of this invention. Pressures from atmospheric to about 10 p.s.i.g. may be used. Solvent-to-hydrocarbon volume ratios of between about 0.1/10 and 20/1.0 may be applied, with a solvent/feed ratio of 3/1 being preferred and 1/1 to 10/1 being within the most practical range.

The extraction process may be carried out at ambient temperature or at temperatures from 50° F. to 200° F. At the lower temperatures, extraction is difficult to carry out because of the higher viscosity of the extraction solvent, while at temperatures approximately 200° F., aromatics such as benzene may be lost by vaporization unless the extraction is carried out in a closed system under superatmospheric pressure. Ordinary prevalent temperatures as well as temperatures up to 120–150° F. are preferred for this process. In addition to the foregoing procedures, the contacting techniques and phase-separation steps disclosed in United States Patents 1,681,657, 2,184,928, 2,186,249, 2,396,302 and 2,792,332 may be used. In addition, the process described in copending application Serial No. 705,674, filed December 27, 1957, may be used.

The small amount of solvent carried over into the raffinate phase may be separated by water dilution and settling. The water-solvent phase so produced is then reconstituted either to anhydrous form or to the original water content by vacuum distillation and recycled to the primary extraction tower. Several procedures are available for separation of the aromatics from the extract phase. Ordinary distillation or vacuum distillation may be applied. The aromatics may be salted out or removed by means of a secondary solvent, in which latter instance distillation may be applied to obtain the purified aromatics from the secondary solvent. A paraffinic hydrocarbon boiling above the boiling point of the desired aromatic may be used as a secondary solvent. Since this invention relates to a new type of selective solvent and not to the technique of its application, there is no necessity for further description of the process steps or variables to be applied. One skilled in this art will know the extraction conditions to apply, and the recovery steps necessary in view of the type of hydrocarbon mixture being treated and the type of aromatic to be separated.

Although the solvents of this invention may be used with or without water, it is practically impossible to maintain strictly anhydrous conditions since most feed hydrocarbons contain some water. Substantially anhydrous conditions can be applied by removing water as it accumulates in the system. One advantage of the solvents disclosed herein is their freedom from emulsification difficulties.

The process of this invention is applicable to the treatment of any type of hydrocarbon mixture from which economical amounts of aromatics, including benzene and alkyl homologues thereof, can be recovered. Such mixtures include products obtained from aromatization and similar reactions. The products obtained from catalytic reforming, hydrocracking, and dehydrocyclization processes may be used as feed for the present process. Any mixtures containing a paraffinic- or naphthenic-type hydrocarbon admixed with aromatics such as benzene, toluene, xylenes, mesitylene, methyl naphthalene, and ethyl benzene, as simple or complex multi-component mixtures, may be used as the starting material. Aromatics can be removed from such feed materials as petroleum distillates, naphthas, gasoline, kerosene, fuel oil fractions, and gas-oil fractions, but the aromatic content of virgin fractions usually is too low to permit economic extraction merely for the sake of obtaining pure aromatics. The charge material should be liquid at ordinary temperatures and not subject to decomposition at the extraction temperatures or to reaction with the selective solvent used herein. One suitable charge oil is the class of products known in the art as catalytic reformates. These liquid products contain relatively high concentrations of desirable aromatic hydrocarbons. Catalytic reformates are obtained by treating naphthas to reforming, dehydrogenation, hydrocracking and dehydrocyclization reactions at temperatures ranging from 850° F. to about 1000° F. with pressures up to 500 p.s.i.g. in the presence of a metal-containing catalyst.

As a more specific illustration, catalytic reformates obtained as a result of the processing of a virgin naphtha, boiling at 175° F.–400° F. (API gravity 50° to 60°), in the presence of a platinum-alumina catalyst at 875° F. to 975° F. and pressures ranging from 200 to 500 p.s.i.g., may be used. Reformates so produced contain from about 30 to 55 vol. percent of aromatics, boil in the range of about 100 to 450° F. and constitute a preferred feed for the present process. For example, reformates produced by reforming a 200°–400° F. virgin naphtha at about 930° F. and 325 p.s.i.g., in the presence of a catalyst comprising about 0.1 wt. percent of platinum on an alumina base, are representative. In general, these reformates having a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON, clear, of 44.6, a RON+0.3 TEL of 71.4, and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, an IBP of 128° F., an EBP of 405° F., a RON, clear, of 89.4, a RON+3 cc. TEL of 98.2, and containing about 48.0 vol. percent paraffins and naphthenes, 1.0 vol. percent olefins and 51.0 vol. percent of aromatics. By precise fractionation and blending to different octane numbers, it was determined that this reformate feed material exhibited the following analysis:

TABLE II

*Aromatics in reformate feed*

| Aromatic: | Vol. percent |
|---|---|
| Benzene | 4.19 |
| Toluene | 13.1 |
| Mixed xylenes and ethyl benzene | 16.51 |
| $C_9$ and heavier aromatics | 17.2 |

Examples of the composition of other reformate feed hydrocarbons that may be used are shown in Table III giving the volume percent of aromatics in each, and the research octane level to which the reforming reaction was directed in each instance.

TABLE III

*Aromatics distribution in various reformates[1]*

[Volume percent]

| Aromatic | 85 Research Octane Level | 95 Research Octane Level |
|---|---|---|
| Benzene | 2.96 | 3.41 |
| Toluene | 9.64 | 12.9 |
| Ethyl benzene | 2.55 | 2.72 |
| p-Xylene | 2.74 | 2.83 |
| m-Xylene | 6.45 | 6.73 |
| o-Xylene | 3.96 | 3.81 |
| $C_9$ and heavier aromatics | 17.3 | 22.4 |
| Total | 45.6 | 54.8 |

[1] These reformate products were from different charge stocks.

In general, these feed stocks for solvent extraction contain a mixture in various proportions of i-butane, n-butane, i-pentane, n-pentane, cyclopentane, 2,2-dimethylbutane, 2,3-dimethylbutane, 2-methylpentane, 3-methylpentane, n-hexane methyl-cyclopentane, 2,2-dimethylpentane, benzene, 2,4-dimethylpentane, cyclohexane, 2,2,3-trimethylbutane, 3,3-dimethylpentane, 1,1-dimethylcyclopentane, 2,3-dimethylpentane, 2-methylhexane, cis-1,3-dimethylcyclopentane, trans-1,2-dimethyl cyclopentane, 3-ethylpentane, n-heptane, 2,2,4-trimethylpentane, cis-1,2-dimethylpentane, methylcyclohexane, methylethylcyclopentane and other $C_8$ hydrocarbons, many $C_9$, $C_{10}$, $C_{11}$ and $C_{12}$ hydrocarbons, toluene, ethylbenzene, p-xylene, o-xylene and m-xylene. These represent the types of hydrocarbon mixtures from which the aromatics, as enumerated, can be separated by the present process. In using reformates as feed hydrocarbons, one purpose is to separate the low-octane components so that they may be recycled or otherwise upgraded in octane number and the high-octane products recovered for gasoline blending.

Another type of feed mixture for solvent extraction comprises various fractions and mixtures of fractions of reformates. For example, a reformate or other source of aromatics may be fractionated to form a benzene concentrate, a toluene concentrate and a xylene concentrate; these may be individually treated or mixed in various proportions and treated to solvent extraction in accordance with this invention to obtain products having a high concentration of the desired aromatic. One such feed material comprises a synthetic mixture of 1 part benzene concentrate, 2 parts toluene concentrate and 1 part xylene concentrate. The purpose of treating such concentrates is to recover aromatics of maximum purity for use as organic intermediates, solvents, etc.

What is claimed is:

1. The process for the recovery of aromatic hydrocarbons and alkyl-substituted homologues thereof from hydrocarbon mixtures containing same which comprises contacting said hydrocarbon mixture with a glycol ester formed by the reaction of a keto-acid with a glycol selected from the group consisting of glycols, diglycol ethers, and polyglycol ethers in an extracting treatment, separating the composite mixture into two separate parts consisting of a raffinate phase and an extract phase, and recovering aromatic hydrocarbons from said extract phase.

2. The process in accordance with claim 1 in which said glycol esters of keto-acids are selected from the group consisting of glycol mono-esters of keto-acids and glycol di-esters of keto-acids and mixtures of same.

3. The process in accordance with claim 2 in which said glycol ester is a di-ester consisting of diethylene glycol dilevulinate.

4. The process in accordance with claim 2 in which said glycol ester is ethylene glycol monopyruvate.

5. The process in accordance with claim 2 in which said glycol ester is ethylene glycol dilevulinate.

6. The process in accordance with claim 2 in which said glycol ester is diethylene glycol γ-acetobutyrate.

7. The process in accordance with claim 2 in which said glycol ester is triethylene glycol dilevulinate.

8. The process in accordance with claim 1 in which said glycol esters comprise esters formed by the reaction of glycols selected from the group consisting of ethylene glycol, propylene glycol, trimethylene glycol, alpha-butylene glycol, beta-butylene glycol, butanediol, tetramethylene glycol, isobutylene glycol, diethylene glycol, triethylene glycol, tetraethylene glycol, pentaethylene glycol, and pinacol with a keto-acid selected from the group consisting of pyruvic acid, acetoacetic acid, levulinic acid, lactarinic acid, geronic acid, isogeronic acid and γ-acetobutyric acid.

9. The process in accordance with claim 1 in which said aromatic hydrocarbons are selected from the group consisting of benzene, toluene, ethylbenzene, o-xylene, m-xylene, p-xylene and their mixtures.

10. The process in accordance with claim 1 in which said hydrocarbon mixture is a catalytic reformate having a boiling range of about 100° to 450° F.

11. The process for the recovery of aromatic hydrocarbons and alkyl-substituted homologues thereof from hydrocarbon mixtures containing same which comprises subjecting said hydrocarbon mixture to solvent extraction using a solvent from the group of

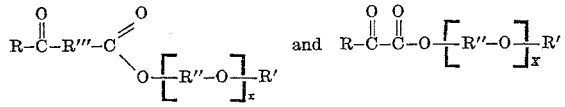

wherein R is selected from the group of alkyl radicals having 1 to 8 carbon atoms and cycloalkyl radicals having 3 to 8 carbon atoms, R" and R"' are alkylene groups or substituted alkylene groups, $x$ has a value of 1 to 6, and R' is selected from the group of hydrogen and the radical

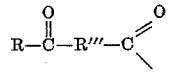

as previously defined, separating the composite mixture into two separate parts consisting of a raffinate phase and an extract phase, and recovering aromatic hydrocarbons from said extract phase.

12. The process in accordance with claim 11 in which R is an alkyl radical having from 1 to 8 carbon atoms.

13. The process in accordance with claim 12 in which R is a methyl group.

14. The process in accordance with claim 12 in which R is a cycloalkyl radical having from 3 to 8 carbon atoms.

15. The process in accordance with claim 11 in which R' is hydrogen.

16. The process in accordance with claim 11 in which R' is the radical

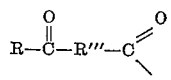

17. The process in accordance with claim 11 in which the aromatic hydrocarbons to be recovered from said hydrocarbon mixtures are selected from the group consisting of benzene, toluene, ethylbenzene, o-xylene, m-xylene, p-xylene and their mixtures.

18. The process in accordance with claim 11 in which said hydrocarbon mixture is a catalytic reformate having a boiling range of about 100 to 450° F.

References Cited in the file of this patent

UNITED STATES PATENTS

| Re. 23,779 | Cope et al. | Feb. 9, 1954 |
| 2,046,063 | Ferris | June 30, 1936 |
| 2,046,951 | Hjerpe et al. | July 7, 1936 |
| 2,087,473 | Govers | July 20, 1937 |
| 2,145,185 | Terres et al. | Jan. 24, 1939 |
| 2,786,085 | Bloch | Mar. 19, 1957 |

UNITED STATES PATENT OFFICE
CERTIFICATION OF CORRECTION

November 15, 1960

Patent No. 2,960,548

George W. Ayers et al.

It is hereby certified that error appears in the above numbered patent requiring correction and that the said Letters Patent should read as corrected below.

Column 1, line 44, strike out "CH$_2$—"; column 2, line 3, for "colecular" read -- molecular --; line 15, for "decarbonization" read -- decarboxylation --; line 49, for "0.1" read -- 0.1 mm. --; column 5, line 30, for "ti" read -- it --.

Signed and sealed this 9th day of May 1961.

(SEAL)
Attest:

ERNEST W. SWIDER
Attesting Officer

DAVID L. LADD
Commissioner of Patents